(12) United States Patent
Aranovich et al.

(10) Patent No.: US 6,363,146 B1
(45) Date of Patent: Mar. 26, 2002

(54) RESET DEVICE

(75) Inventors: Eugene Aranovich, Middletown; Edwin A. Muth, Aberdeen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/131,245

(22) Filed: Aug. 7, 1998

(51) Int. Cl.[7] ............................................. H04M 1/00
(52) U.S. Cl. ...................... 379/422; 455/573; 320/134
(58) Field of Search ................... 379/422, 413; 455/571–574; 320/127, 134–136

(56) References Cited

U.S. PATENT DOCUMENTS

| | | | |
|---|---|---|---|
| 5,115,182 A | * | 5/1992 | Ehmke et al. ............... 455/573 |
| 5,142,563 A | * | 8/1992 | Nyuu et al. .................. 455/573 |
| 5,870,685 A | * | 2/1999 | Flynn .......................... 455/573 |

* cited by examiner

Primary Examiner—Wing F. Chan

(57) ABSTRACT

A reset device is disclosed which may be used in electrical devices such as portable telephones. The reset device includes a source, such as a rechargeable battery, which provides an input voltage and a threshold voltage. The reset device also has a comparator with a first input which receives the input voltage and a second input which receives the threshold voltage. A voltage changing device varies the threshold voltage in response to the output level of the comparator and a rate of increase of the input voltage. The voltage changing device includes a capacitor which delays an increase of the threshold voltage when the input voltage increases. Further, the voltage changing device includes a positive feedback resistor for increasing the threshold voltage when the output level increases. Thus, the positive feedback resistor allows switching the threshold voltage from a first threshold level to a second threshold level when the output level switches from a low level to a high level. The reset device further includes a regulator which regulates the input voltage to provide the threshold voltage. In addition, a switch is connected to an output of the comparator for providing a reset signal to a load. Illustratively, a controller receives the reset signal and resets the load, e.g., the portable phone. In response to the reset signal, the controller switches the portable phone between a dormant mode and an active mode. In addition, the controller allows trickle charging of the rechargeable battery in the dormant mode and rapid charging in the active mode.

20 Claims, 3 Drawing Sheets

RESET DEVICE

BACKGROUND OF THE INVENTION

1. Field of the Invention

The present invention is directed to a reset device, and more particularly, to a reset device having a variable threshold to prevent unwanted resets of systems incorporating the reset device, such as systems having rechargeable batteries like wireless phones and portable computers.

2. Discussion of the Prior Art

In systems having controllers, such as micro-processors or digital signal processors (DSPs), the controller resets the system ON and OFF depending on the system's power input voltage level. For a system having a rechargeable battery and a controller, such as wireless telephones or portable computers, the controller is reset to turn OFF the system, or switch it to a dormant mode where minimal current is consumed, when the battery voltage drops below a predetermined threshold level. A comparator is used to detect when the battery voltage crosses the predetermined threshold voltage level, thus detecting whether the battery voltage is above or below the predetermined threshold.

The controller also turns ON the system when the battery voltage increases above this predetermined threshold level. When the battery voltage momentary drops below a certain level and then returns to normal, referred to as battery re-bound the controller turns OFF and ON, i.e., resets the system. In certain cases, a reset is not desirable when a re-bound of the battery voltage occurs.

One case where a reset is not desirable occurs when the voltage of a rechargeable battery, such as a NiCad battery, re-bounds due to shut-off of a load. Illustratively, the load is a wireless telephone, which is shut-off by the controller since the battery voltage drops below the threshold value. Normally, the voltage of a three cell NiCad Battery is about 3.8 Volts (V). During battery discharge, the voltage drops from approximately 3.8 V to approximately 3.3 V. At the 3.3 V level, the battery is almost fully discharged.

Rechargeable batteries typically suffer permanent damage when fully discharged. To prevent permanent battery damage, it is recommended that near the fully discharged point, e.g., 3.3 V, the load should be turned OFF to prevent further or deep/full discharge of the battery. When the load is turned OFF, the voltage of the almost fully discharged battery slowly re-bounds from approximately 3.3 V to approximately 3.75 V~3.80 V, i.e., to approximately the normal battery voltage. Since the voltage level of the battery with the load turned OFF re-bounds to about 3.8 V, which is also the normal battery voltage, the micro-processor will restart and turn ON the system.

As a result of turning ON the system or wireless telephone, the current draw increases. Since the battery is discharged and cannot deliver much current, the battery voltage drops rapidly and the system resets or shuts OFF again. This process repeats itself with increasingly shorter periods of time, causing power oscillation, which is dangerous to the system, and can cause permanent corruption of the system memory, such as an electrically erasable programmable read only memory (EEPROM).

To solve the problem of power oscillation due to battery re-bound resulting from system shut-off, a flip flop is used to exploit a hysteresis effect of the comparator and prevent the power oscillation. However, the flip flop suffers from a number of disadvantages, such as increased cost and reduced response time. In particular, the flip flop has an inherent memory. Thus, when power is removed, the flip flop can remember its last state for a certain period of time.

Further, when the flip flop is first turned ON, it could be in a high or low state. This state of the newly turned ON flip flop is random and unpredictable. Accordingly, the flip flop must first be reset to a desirable initial condition. Using the flip flop not only increases cost, but also reduces response time due to the need for initially resetting the flip flop.

Accordingly, there is a need for a reset device which prevents power oscillation and system damage, is quick and cost effective, and has no inherent memory.

SUMMARY OF THE INVENTION

The object of the present invention is to provide a reset device which eliminates the problems of conventional reset devices.

Another object of the present invention is to provide a reset device which prevents power oscillation and system damage.

A further object of the present invention is to provide a reset device which has no inherent memory.

A still further object of the present invention is to provide a reset device which has a quick response time and is cost effective.

The present invention accomplishes the above and other objects by providing a reset device which may be used in electrical devices such as portable telephones. The reset device includes a source, such as a rechargeable battery, which provides an input voltage and a threshold voltage. The reset device also has a comparator with a first input which receives the input voltage and a second input which receives the threshold voltage. A voltage changing device varies the threshold voltage in response to the output level of the comparator and a rate of increase of the input voltage.

Illustratively, the voltage changing device includes a capacitor which delays an increase of the threshold voltage when the input voltage increases. Further, the voltage changing device includes a positive feedback resistor for increasing the threshold voltage when the output level increases. Thus, the positive feedback resistor allows switching the threshold voltage from a first threshold level to a second threshold level when the output level switches from a low level to a high level.

The reset device further includes a regulator which regulates the input voltage to provide the threshold voltage. In addition, a switch is connected to an output of the comparator for providing a reset signal to a load. Illustratively, a controller receives the reset signal and resets the load, e.g., the portable phone. In response to the reset signal, the controller switches the portable phone between a dormant mode and an active mode. In addition, the controller allows trickle charging of the rechargeable battery in the dormant mode and rapid charging in the active mode.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
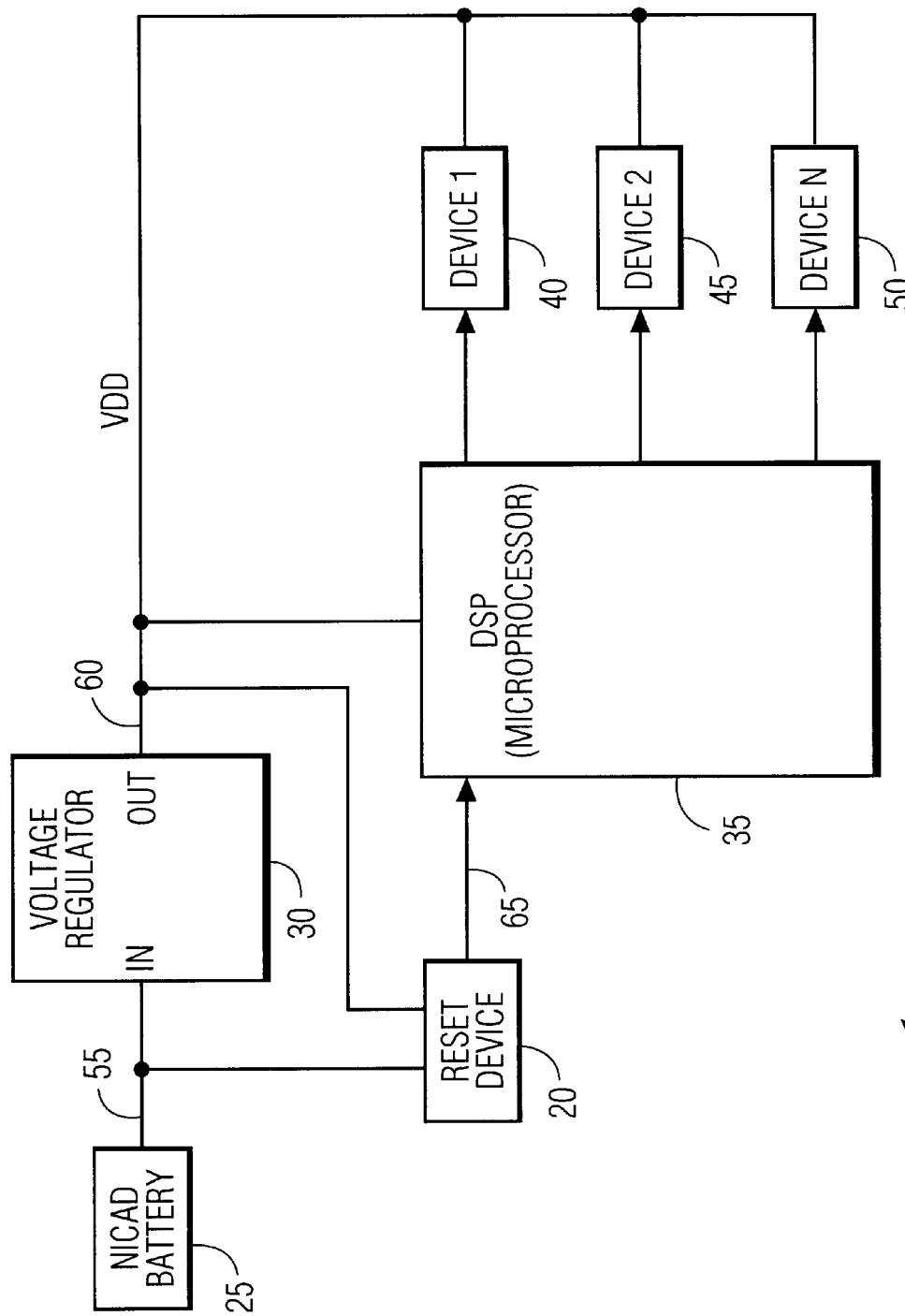
FIG. 1 shows a system having a reset device according to the present invention.

FIG. 1 shows a system 10 having a reset device 20. Illustratively, the system 10 is a portable system such as a wireless phone or a portable computer for example. A rechargeable battery 25 is included to provide a voltage level to d voltage regulator 30. The voltage regulator 30 regulates the battery voltage and outputs a regulated voltage level $V_{DD}$ used to power up system components, such as a controller 35 and various devices 1 to N referred to in FIG. 1 by numerals 40, 45, 50. Illustratively, the controller 35 is a micro-processor or digital signal processor (DSP) and the devices 40, 45, 50 include a system clock oscillator, a power amplifier, and analog-to-digital converter. The reset device 20 is connected to the battery output 55 and to the voltage regulator output 60, i.e., to $V_{DD}$. The output of the reset device 20 is connected to an input reset line 65 of the DSP 35.

Figure 2:
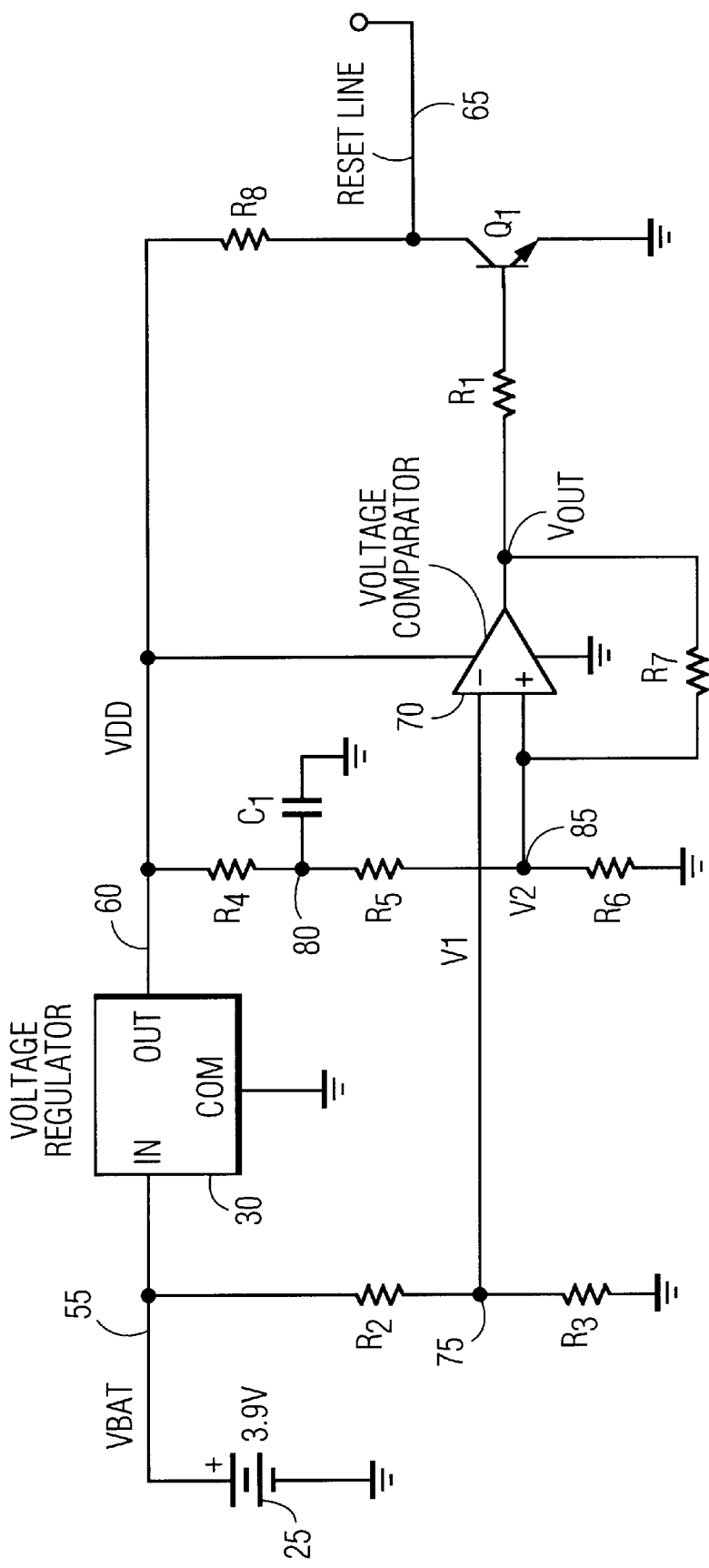
FIG. 2 shows the reset device of FIG. 1 in greater detail according to the present invention.

FIG. 2 shows the reset device 20 in greater detail. As shown in FIG. 2, the reset device 20 includes a voltage comparator 70 which is connected to the battery output 55 through a resistive voltage divider of two resistors $R_2$, $R_3$, for example. In particular, the two resistors $R_2$, $R_3$ are connected in series between the battery output 55 and ground. The common tap (or inter-connected terminals) of the two resistors $R_2$, $R_3$ is connected to the inverting or negative input of the comparator 70 to provide a divided battery voltage $V_1$.

The reset device 20 also includes a second voltage divider of three resistors $R_4$, $R_5$, $R_6$, for example, which are connected in series between the output 60 of the voltage regulator 30 and ground. The first resistor $R_4$ of the three resistor $R_4$, $R_5$, $R_6$ voltage divider has one terminal which is connected to $V_{DD}$ and another terminal 80 which is connected to the second resistor $R_5$ and a capacitor $C_1$. The other terminal of the capacitor $C_1$ is connected to ground. The capacitor $C_1$ provides an installation threshold which is close to zero, such as approximately 0.1 volt (V). As will be described, the low installation threshold level is due to the time constant of the resistor $R_4$ and capacitor $C_1$. This installation threshold is used by the comparator when a recharged battery is installed.

The second and third resistors $R_5$, $R_6$ of the three resistor $R_4$, $R_5$, $R_6$ voltage divider are inter-connected at a node 85, which is connected to the non-inverting or positive input of the comparator 70. The terminal opposite to node 85 of the third resistor $R_6$ is connected to ground. The voltage applied to the positive input of the comparator 70 is referred to as the threshold voltage $V_2$.

A positive feedback resistor $R_7$ is connected between the output of the comparator 70 and its positive input. Further, a base resistor $R_1$ is connected between the output of the comparator 70 and base of a transistor $Q_1$, which is an NPN bipolar transistor, for example. The collector of the transistor $Q_1$ is connected to the reset line 65, which is also shown in FIG. 1 and is the output of the reset device 20. In addition, a pull-up resistor $R_8$ is connected between the transistor collector and regulated voltage $V_{DD}$.

The reset device 20 has an ultra low current draw and the threshold voltage $V_2$ at the comparator positive input has variable reset levels. Illustratively, the current draw of the reset device 20 is approximately 5 $\mu$A to 10 $\mu$A. The comparator threshold voltage $V_2$ is varied to quickly turn-on the load device, e.g., the telephone or handset, when a charged battery is installed, and to prevent a reset or turn-on of the handset due to battery re-bound for a nearly discharged battery. As described, the battery re-bound occurs when the handset is shut off by the DSP, thus causing the discharged battery voltage to re-bound to a normal level without having current drive capability.

In particular, for a recharged battery being installed, i.e., for a rapidly increasing battery voltage $V_{bat}$ or input voltage $V_1$ provided to the negative input of the comparator 70, the reset threshold $V_2$ at the positive comparator input is set to approximately 0.1 V to provide a reset for quickly turning ON the phone. The capacitor $C_1$ provides this 0.1 V quick reset threshold (rt) level of the threshold voltage $V_2$, referred to as the installation threshold level used for battery installation. Note that the input voltage $V_1$ is proportional to the battery voltage $V_{bat}$ which is divided by the voltage divider of two resistors $R_2$, $R_3$ to provide the input voltage $V_1$.

Figure 3:
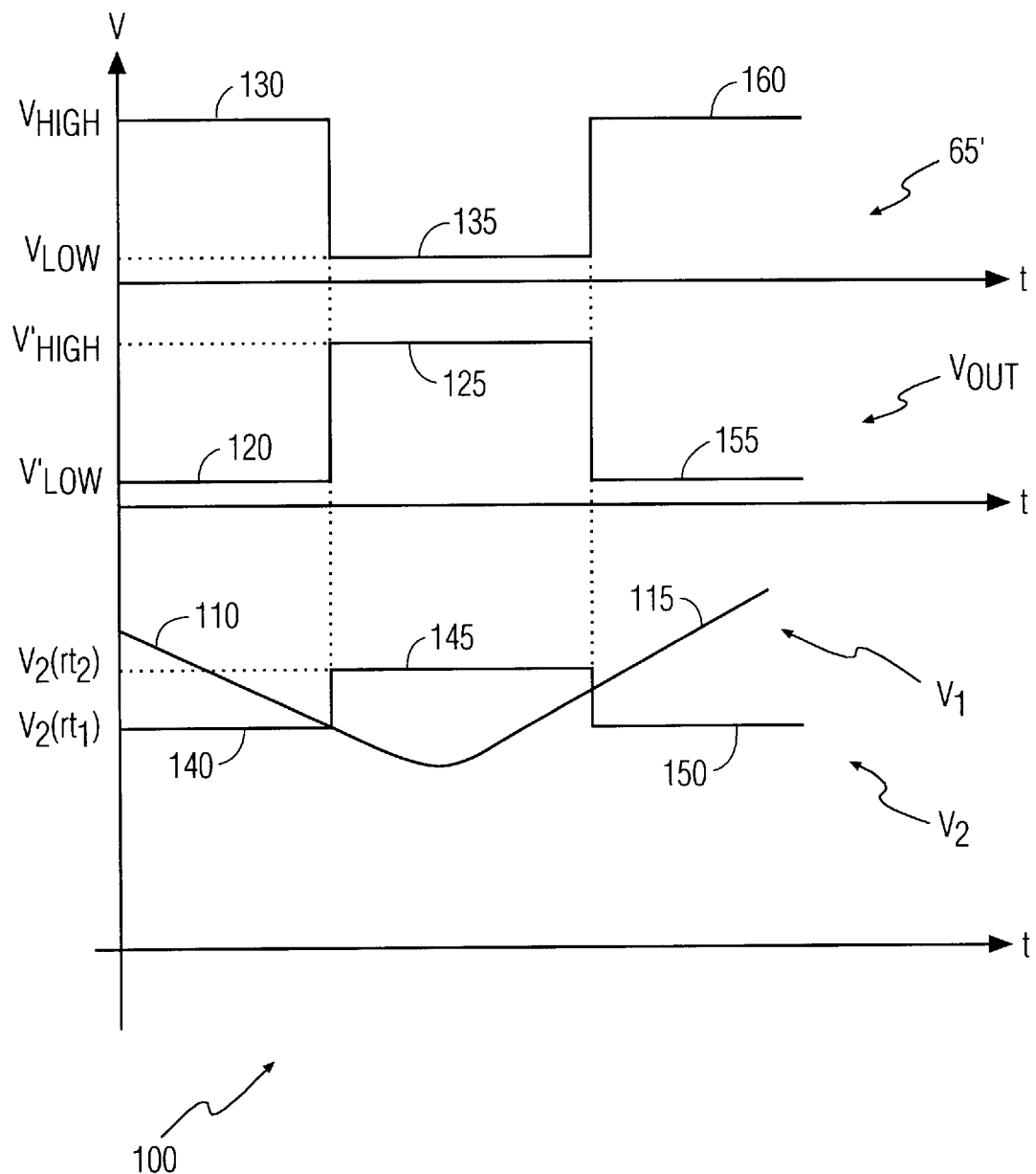
FIG. 3 shows curves of threshold levels as well as input and output signals of the reset device according to the present invention.

In addition to the installation threshold level, the threshold voltage $V_2$ has two other threshold levels $V_2(rt_1)$, $V_2(rt_2)$. FIG. 3 shows voltage versus time curves 100 of the variable reset threshold $V_2$ provided to the positive comparator input, showing the two threshold levels $V_2(rt_1)$, $V_2(rt_2)$; the input voltage $V_1$ provided to the negative input of the comparator 70; the comparator output $V_{out}$; and the reset signal 65' on the reset line 65 (FIGS. 1–2).

The comparator output $V_{out}$ is the compliment of the reset signal 65' on the reset line 65 (FIGS. 1–2) provided to the DSP 35 (FIG. 1). This is because the emitter of the transistor $Q_1$ is connected to ground and, when the comparator output $V_{out}$ is high, the transistor $Q_1$ is turned ON to ground the reset line 65. With a low or grounded reset line 65, the DSP 35 (FIG. 1) switches to a system dormant mode, where the phone and devices 40, 45, 50 (FIG. 1) are turned OFF or nearly turned OFF to prevent system damage and full/deep discharge of the rechargeable battery 25. When the comparator output $V_{out}$ is low, the transistor $Q_1$ is turned OFF and the pull-up resistor $R_8$ provides a high level on the reset line 65. In response to the high reset level on the reset line 65, the DSP 35 switches the system mode from dormant to active and fully turns ON the phone and devices 40, 45, 50 (FIG. 1).

As shown in FIG. 3, the comparator inverting input voltage $V_1$ gradually decreases 110 and then increases 115; and the variable reset threshold (rt) $V_2$ provided to the positive comparator input changes between the two levels $V_2(rt_1)$ and $V_2(rt_2)$. Illustratively, the low reset threshold $V_2(rt_1)$ is set to 1.17 V, which translates to a battery voltage $V_{bat}$ of 3.3 V, for the gradually decreasing input voltage $V_1$ 100 which is the normal battery discharge case. The 3.3 V battery voltage level of the low or discharge threshold $V_2(rt_1)$ is the level of a normal battery discharge below which the reset or comparator output voltage $V_{out}$ is changed from $V_{low}'$ 120 to $V_{high}'$ 125 for switching the system mode from active to dormant. The reset signal 65', being the complement of comparator output voltage $V_{out}$ drops from $V_{high}$ 13o to $V_{low}$ 135.

After the input voltage $V_1$ drops below the first or low reset threshold voltage level $V_2(rt_1)$ of 1.17 V, or 3.3 V battery voltage level, in addition to the comparator output voltage $V_{out}$ increasing to $V_{high}'$ 125, the reset threshold level $V_2$ increases from the 1.17 V low level of $V_2(rt_1)$ 140 ($V_{bat}$ of 3.3 V) to the second or high level $V_2(rt_2)$ 145. The higher threshold $V_2(rt_2)$ is set to 1.31 V, which translates to a battery voltage $V_{bat}$ of 3.75 V, for example, and is referred to as the re-bound threshold since it is the threshold used when the battery voltage is re-bounding or increasing, which is shown as numeral 115 in FIG. 3.

When the gradually increasing or re-bounding battery $V_{bat}$ or input voltage $V_1$ 115 rises above the re-bound or high low threshold level $V_2(rt_2)$ 145, the threshold $V_2$ decreases from the re-bound threshold level $V_2(rt_2)$ 145 to the discharge or low threshold level $V_2(rt_1)$ 150. In addition, the comparator output $V_{out}$ drops from $V_{high}'$ 125 to $V_{low}'$ 155. Naturally, the complement of the comparator output $V_{out}$, i.e. the reset signal 65' rises from $V_{low}$ 135 to $V_{high}$ 160.

It in noteworthy that the reset device 20 clears it's state when the battery voltage is removed. Thus, the reset device 20 has no inherent memory to interfere with the events described above when a recharged battery is installed, where the installation threshold level of the threshold voltage $V_2$ is set to approximately 0.1 V by the capacitor $C_1$.

Considerations for component selection and circuit operation are described next with reference to FIG. 2. Initially on power-up where a recharged battery is installed, the normal battery voltage is between 3.3 V and 4.0 V, the input voltages $V_1$ rapidly increases. The threshold voltage $V_2$ increases less rapidly than the input voltages $V_1$ and initially stays close to zero.

The delay in the increase of the threshold voltage $V_2$ is due to the time constant of the capacitor $C_1$ and resistor $R_4$, which time constant is approximately 0.47 msec, for example. The values of the resistors are selected such that the ratios $R_2/R_3$ and $R_4+R_5/R_6$ ensure that the input voltages $V_1$ is always greater than the threshold voltage $V_2$ upon power-up with a normal battery having a voltage of approximately between 3.3 V to 4 V. As a result, the voltage comparator output state is low, and the transistor $Q_1$ does not conduct. The reset line 65 is pulled up by the pull-up resistor $R_8$ to place the DSP 35 (FIG. 1) in the active mode for turning ON the phone and the various devices 40, 45, 50 (FIG. 1).

The reset threshold in this state is defined by the $V_2(rt_1)$ voltage given by equation (1):

$$V_2(rt_1) = V_{DD} \frac{\frac{R_6 R_7}{R_6 + R_7}}{R_4 + R_5 + \frac{R_6 R_7}{R_6 + R_7}} \quad (1)$$

In this illustrative example where $V_2(rt_1)=1.17$ V, the selected values of the resistors for the ratio $R_2/R_3$ provide a reset condition when the battery voltage $V_{bat}$ drops below 3.3 V from its normal voltage of approximately 4 V. Note, the trip or reset point of 3.3 V at the battery, i.e., $V_{bat}$ translates to the 1.17 V level for the lower reset threshold value $V_2(rt_1)$ at the non-inverting input of the comparator 70.

When $V_{bat}$ which is proportional to the voltage level at the inverting input of the comparator 70, i.e., $V_1$, decreases from its normal voltage of approximately 4 V and crosses 3.3 V, the comparator output $V_{out}$ switches to the high state $V_{high}'$ 125 (FIG. 3). The transistor $Q_1$ becomes conductive, and the reset line 65 becomes low, i.e., a reset state for the DSP where the DSP turns OFF the phone and devices 40, 45, 50 controlled thereby.

When the comparator output switches to the high state $V_{high}$ (FIG. 3), the threshold voltage $V_2$ increases due to the positive feedback resistor $R_7$. The reset trip voltage changes at this time, and is defined by $V_2(rt_2)$ given by equation (2):

$$V_2(rt_2) = \frac{V_{DD}}{R_4 + R_5 + \frac{R_6 R_7}{R_6 + R_7}} \cdot \frac{R_6 R_7}{R_6 + R_7} + \frac{V_{sat}}{R_7 + \frac{R_6(R_4 + R_5)}{R_6 + (R_4 + R_5)}} \cdot \frac{R_6(R_4 + R_5)}{R_6 + (R_4 + R_5)} \quad (2)$$

where $V_{sat}$ is the saturation voltage for the comparator output in the high state and is the same as $V_{high}'$ shown in FIG. 3. In this case, $V_2(rt_2)=1.31$ V for a reset trip battery voltage $V_{bat}$ of 3.75 V, for example.

Now, lets assume that the battery is discharged and re-bounds since the phone is turned OFF. The voltage $V_{bat}$ (FIG. 2) slowly increases up to 3.7 V. The selected value of the resistor ratio $R_2/R_3$ provides the reset threshold to be $V_{bat}=3.75$ V for the case where the battery voltage $V_{bat}$, and thus the comparator inverting input voltage $V_1$, is going up. So, the battery can never reach the reset trip voltage of 3.75 V, and the DSP is protected against false resets.

Next, assume the handset is back into the charging cradle. The battery starts charging with a trickle current (35–70 mA), which is always supplied by the hardware or charger, to guarantee that when the DSP is in the reset state (i.e., idle), the trickle charge will increase the battery voltage $V_{bat}$ (FIGS. 2) to 3.75 V. When the battery voltage $V_{bat}$ increases to reach 3.75 V, which in effect the same as when the input voltage $V_1$ increases to reach the upper reset threshold value $V_2(rt_2)$ of 1.31 V, then the reset trips. When the reset trips, the comparator output voltage $V_{out}$ goes low to turn OFF the transistor $Q_1$ so that the reset line 65 (FIG. 2) is pulled up by the pull-up resistor. The high reset line 65 turns ON the DSP to become active and to turn ON a rapid charge for quickly charging the battery.

Note, in the dormant mode where the reset signal 65' is low, as shown by numeral 135 in FIG. 3, the charger mode is slow charge. Thus, when a charger is connected to the battery 25, it is trickle charged. In the active mode where the reset signal 65' is high as shown by numerals 130, 160 in FIG. 3, the DSP 35 (FIG. 1) switches the charge mode from trickle charge to quick charge.

Thus, when $V_{bat}$ crosses 3.75 V going up, the comparator output $V_{out}$ switches to the low state 155. The transistor $Q_1$. becomes non-conductive, and the reset line 65 becomes high 160, which is active state for the DSP. The DSP can become active only when battery voltage $V_{bat}$ reaches 3.75 V, that is when the battery is charged to this predetermined level of 3.75 V.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A reset device comprising:
   a source which provides an input voltage and a threshold voltage;
   a comparator having a first input which receives said input voltage and a second input which receives said threshold voltage; and
   a voltage changing device which varies said threshold voltage in response to one of an output level of said comparator and a rate of increase of said input voltage.

2. The reset device of claim 1, wherein said voltage changing device includes a combination of a resistor and a capacitor having a time constant which increases said threshold voltage less rapidly than an increase of said input voltage.

3. The reset device of claim 1, wherein said voltage changing device includes a capacitor which delays an increase of said threshold voltage when said input voltage increases.

4. The reset device of claim 1, wherein said voltage changing device includes a positive feedback resistor for increasing said threshold voltage when said output level increases.

5. The reset device of claim 1, wherein said voltage changing device includes a positive feedback resistor for switching said threshold voltage from a first threshold level to a second threshold level when said output level switches from a low level to a high level.

6. The reset device of claim 1, wherein said first input is an inverting input and said second input in a non-inverting input.

7. The reset device of claim 1, wherein said source is a battery.

8. The reset device of claim 1, further comprising a regulator which regulates said input voltage to provide said threshold voltage.

9. The reset device of claim 1, further comprising a switch connected to an output of said comparator for providing a reset signal to a load.

10. An electrical device comprising:
a source which provides an input voltage;
a controller which controls said electrical device; and
a reset circuit which resets said controller in response to a level of said input voltage;
said reset circuit including:
a comparator having a first input which receives said input voltage and a second input which receives a threshold voltage; and
a voltage changing device which varies said threshold voltage in response to one of an output level of said comparator and a rate of increase of said input voltage.

11. The electrical device of claim 10, wherein said voltage changing device includes a capacitor which delays an increase of said threshold voltage when said input voltage increases.

12. The electrical device of claim 10, wherein said voltage changing device includes a positive feedback resistor for increasing said threshold voltage when said output level increases.

13. The electrical device of claim 10, wherein said first input is an inverting input and said second input in a non-inverting input.

14. The electrical device of claim 10, wherein said source is a battery.

15. The electrical device of claim 10, further comprising a regulator which regulates said input voltage to provide said threshold voltage.

16. The electrical device of claim 10, further comprising a switch connected to an output of said comparator for providing a reset signal to a load.

17. A portable telephone comprising:
a rechargeable battery which provides an input voltage;
a regulator which regulates said input voltage to provide a regulated voltage;
a controller which receives said regulated voltage, said controller switching said portable telephone between a dormant mode and an active mode in response to a reset signal; and
a reset device which provides said reset signal in accordance with a level of said input voltage;
said reset device including:
a comparator having a first input which receives said input voltage and a second input which receives threshold voltage derived from said regulated voltage; and
a voltage changing device which varies said threshold voltage in response to one of an output level of said comparator and a rate of increase of said input voltage.

18. The portable telephone of claim 17, wherein said controller allows trickle charging of said rechargeable battery in said dormant mode and rapid charging of said rechargeable battery in said active mode.

19. The portable telephone of claim 17, wherein said voltage changing device includes one of a capacitor which delays an increase of said threshold voltage when said input voltage increases and a positive feedback resistor which increases said threshold voltage when said output level increases.

20. A reset device comprising:
power means for providing an input voltage and a threshold voltage;
comparing means for comparing said input voltage with said threshold voltage; and
voltage varying means for varying said threshold voltage in response to one of an output level of said comparing means and a rate of increase of said input voltage.

* * * * *